United States Patent [19]

Mansson

[11] 3,809,998

[45] May 7, 1974

[54] CURRENT REGULATOR FOR PULSE EDDY CURRENT TESTER

[75] Inventor: Sven E. Mansson, Hollviksnas, Sweden

[73] Assignee: Magnetic Analysis Corporation, Mt. Vernon, N.Y.

[22] Filed: Feb. 1, 1973

[21] Appl. No.: 328,889

[52] U.S. Cl............... 323/4, 307/264, 307/270, 324/40, 328/175, 323/22 T, 307/297
[51] Int. Cl............................................ G05f 1/56
[58] Field of Search............... 323/4, 9, 8, 22 T; 307/228, 264, 268, 270, 297; 324/40; 328/115, 117, 173, 175

[56] References Cited
UNITED STATES PATENTS

| | | |
|---|---|---|
| 3,314,006 | 4/1967 | Hentschel............... 324/40 |
| 3,361,960 | 1/1968 | Renken, Jr. et al............... 324/40 |
| 3,436,563 | 4/1969 | Regitz............... 307/228 X |

Primary Examiner—Gerald Goldberg
Attorney, Agent, or Firm—Pennie & Edmonds

[57] ABSTRACT

A resistor and coil driver are connected in series between the D-C power supply and test coil of a pulse eddy current tester. A regulator responsive to the voltage across the series resistor produces a D-C control voltage varying with the average current to the test coil. Pulses from a pulse generator and the D-C control voltage are supplied to a clipper, and the output of the clipper is supplied to the coil driver to produce pulses in the test coil whose average current is substantially constant.

8 Claims, 3 Drawing Figures

CURRENT REGULATOR FOR PULSE EDDY CURRENT TESTER

BACKGROUND OF THE INVENTION

This invention relates to a current regulator for a pulse eddy current tester.

Eddy current testing apparatus is well-known, and is particularly useful in the non-destructive testing of conductive objects to determine defects or flaws therein. In such apparatus a test coil assembly is energized to induce eddy currents in an object under test, and responds to changes in the eddy current flow to produce output signals varying with defects or flaws in the object.

In one type of apparatus objects of uniform cross-section such as bars, tubes, wires, etc. are continuously passed through a primary coil in the coil assembly, and a pair of secondary coils connected in series opposition produce a null output when the eddy current field is uniform. Then, any discontinuities in the object which alter the eddy current magnitude or distribution will produce output flaw signals which are detected and indicated in a desired manner. Instead of having the object pass through the coil assembly, the assembly may be arranged as a probe which is moved relative to the surface of the object under test.

Another type of eddy current test apparatus operates as a comparator, that is, an object is placed in one set of coils and the resultant signal compared with that of a reference object placed in another set of coils. Here also, the secondary coils are commonly connected in opposition to produce a null signal when the objects are alike, and an output signal when they are unlike.

Pulse excitation of a test coil assembly is known in which DC pulses are applied to the test coil assembly. Application Ser. No. 317,140 filed Dec. 21, 1972 by the present inventor and entitled "Pulse Eddy Current Testing Apparatus" discloses apparatus for generating stable pulses which are closely controlled in duration, amplitude and pulse repetition frequency (PRF).

It has been found in practice that under some operating conditions the impedance of the test coil may change substantially during operation, due to increase in the coil impedance as the coil becomes heated and other factors such as loading of the coil by the test piece. As the coil impedance increases, the current supplied thereto decreases, and reduces the sensitivity of the apparatus to defects or flaws. In addition, different coils of presumably identical construction may actually have somewhat different impedances which will affect sensitivity. The effects are particularly noticeable at lower frequencies of operation where large currents may be employed. At higher frequencies the coil impedance may be so high that only much smaller currents are feasible without undue expense, and changes in coil impedance may be less serious.

The present invention provides a relatively simple current regulator which maintains a substantially constant average current in the test coil despite changes in the coil impedance, over the regulating range, and permits conveniently changing the average current to the desired value. Under a given set of operating conditions, maintaining a constant average current maintains a relatively constant peak current in the test coil, or at least maintains the peak current more constant than without regulation. The regulator also serves to protect the coil driver stage in case the coil becomes short-circuited.

SUMMARY OF THE INVENTION

In accordance with the invention a coil driver for applying pulses to the test coil means or assembly is connected in series between a D-C power supply and the test coil assembly, and a resistor is connected in series between the power supply and the coil driver. A regulator circuit is responsive to the voltage across the resistor and produces a control signal which varies with the average current through the resistor and hence with the average current to the test coil assembly. Amplitude control means responsive to the control signal changes the amplitude of the pulses supplied to the coil driver in a direction to maintain the average coil current substantially constant.

Advantageously the amplitude control means is a clipper supplied with pulses from a pulse generator, and the regulator circuit provides a D-C control signal which changes the peak clipping level of the pulses. The resultant clipped pulses are then supplied to the coil driver.

In operation, changes in the impedance of the coil assembly which tend to change the average current therethrough are sensed by the series resistor and the amplitude of the driving pulses is changed in a direction to maintain the average current constant. The average current may be changed by changing the value of the series resistor. Also, in case of a short circuit the maintaining of the selected average current avoids burning out the coil driver.

Advantageously a Zener diode and shunt capacitor are inserted between the test coil and ground, to provide for rapid dissipation of energy stored in the coil at the end of a pulse and also control of the coil current waveshape.

DESCRIPTION OF THE SPECIFIC EMBODIMENT

Figure 1:
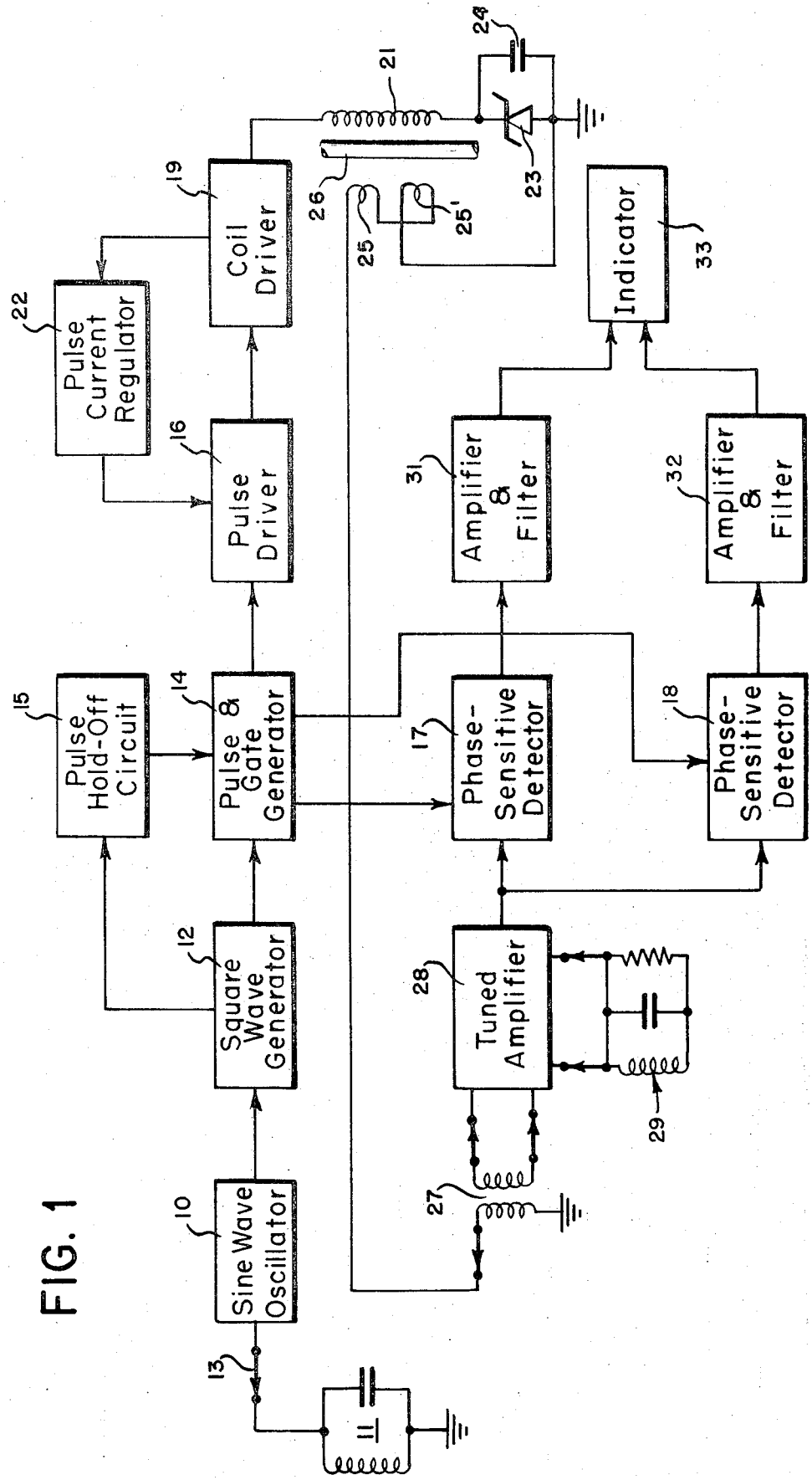
FIG. 1 is a block diagram of a pulse eddy current flaw detector in which the invention may be employed.

Referring to FIG. 1, a sine wave oscillator 10 including a tank circuit 11 supplies a sine wave to a square wave generator 12. Different tank circuits may be connected to oscillator 10 through switch 13 so that the frequency of the sine wave can be selected as desired. Outputs of the square wave generator are supplied to a pulse and gate generator 14 and to a pulse hold-off circuit 15.

The pulse hold-off circuit functions to alternatively allow and prevent the production of output pulses by the pulse generator in 14, so that the output pulses correspond to regularly recurring non-sequential excursions of one polarity of the square wave supplied to the pulse generator. Accordingly output pulses are supplied to pulse driver 16 of desired duty cycle in which the pulses are precisely related in time occurrence and duration to the half-cycles in the input square wave which are not eliminated by the hold-off circuit. Thus, if alternate excursions of one polarity of the input square wave are eliminated, output pulses of 25 percent duty cycle and a PRF (pulse recurrence frequency) half the frequency of the input square wave, and hence half the frequency of the initial sine wave, may be produced.

Generator 14 also produces quadrature gating pulses which are supplied to phase-sensitive detectors 17, 18.

Output pulses from the pulse driver 16 are fed to coil driver 19 and thence to the primary winding 21 of an eddy current flaw detector coil assembly.

Block 22 is a pulse current regulator to which the present invention is directed, and will be described below in connection with FIG. 2. A Zener diode 23 and shunt capacitor 24 provide a discharge path to release the energy stored in primary 21 at the end of a driving pulse, and control of the coil current waveshape, as will also be described below.

Two secondary coils 25, 25' are connected in series opposition to form a null coil arrangement which yields little or no output in the absence of a flaw or other irregularity in the object 26 fed therethrough, but yields an output varying in amplitude and/or phase in the presence of a flaw or other irregularity. The output of the null coils is supplied through a switchable transformer 27 to a tuned amplifier 28 which includes a switchable tuned circuit 29. Different transformers and tuned circuits may be switched into operation along with the switching of the oscillator tank circuit 11.

The output of the tuned amplifier 28 is supplied to the phase-sensitive detectors 17, 18, along with the quadrature gates from generator 14, to produce quadrature signal components. These are fed to respective amplifiers and filters 31, 32 and then to an indicator 33 such as a cathode-ray tube, in accordance with known practice.

The above arrangement and specific circuits for generating the pulses are described in application Ser. No. 317,140, filed Dec. 21, 1972 by the present inventor. It will be understood that the present invention is not limited to the specific arrangement shown, and may be employed in other types of test apparatus and with other means for generating pulses.

Figure 2:
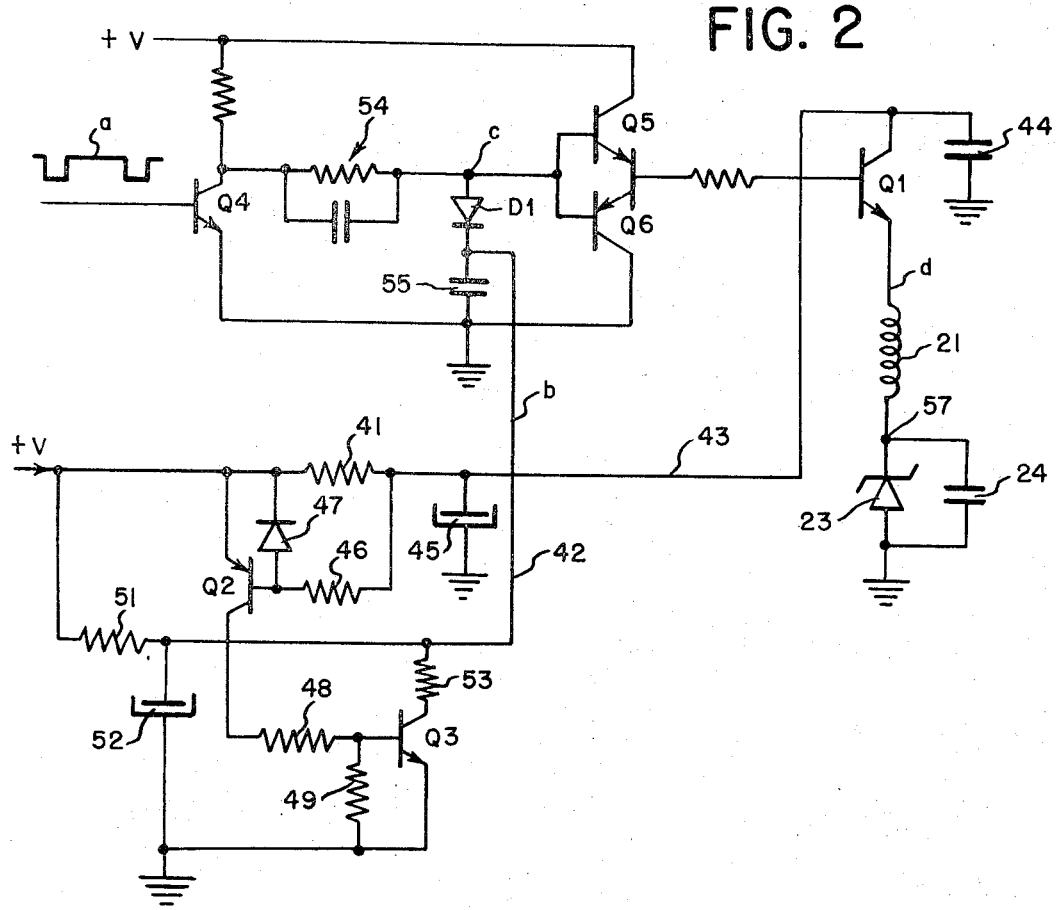
FIG. 2 is a circuit diagram of a current regulator in accordance with the invention.
Figure 3:
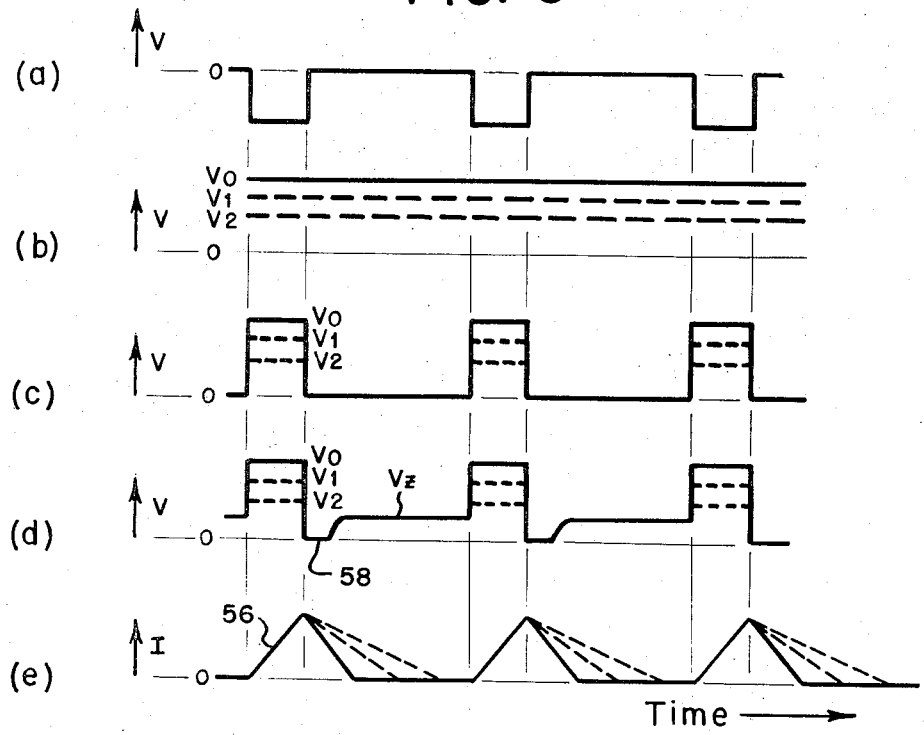
FIG. 3 shows waveforms for FIG. 2.

Referring to FIGS. 2 and 3, letters $a - d$ in FIG. 2 refer to corresponding waveforms in FIG. 3. In FIG. 3 the reference level "0" indicates voltage levels at or near ground potential or other reference potential. Both PNP and NPN transistors are used in specific locations, but it will be understood that the types can be selected as desired, with appropriate change of voltages, etc., if required, as will be understood by those skilled in the art.

Referring to FIG. 2, the coil driver Q1 has its output connected in series between coil 21 and a D-C power supply designed +V. A power transistor is preferred, as shown, although other types of coil drivers could be employed if desired. A precision resistor 41 is connected in series between the power supply and coil driver Q1 so as to sense the average current supplied to coil 21. A regulator including Q2 and Q3 is responsive to the voltage across resistor 41 to develop a control singal $b$ in line 42. Pulses from the pulse generator 14 (FIG. 1) are supplied through a clipper including Q4 and D1, and an intermediate driver Q5, Q6 to the coil driver Q1. The clipper is supplied with the control signal $b$ so as to change the amplitude of the pulses supplied to coil driver Q1 in a direction to maintain the average current in coil 21 constant.

Considering the circuits in more detail, Q1 is a power transistor connected as an emitter follower, with the emitter connected to coil 21 and the collector to power supply line 43. Capacitor 44 eliminates transients, etc. which may develop in line 43. A large electrolytic filter capacitor 45 at the output end of resistor 41 eliminates most of the pulse surges through the resistor as Q1 is pulsed, so that the current through the resistor is approximately the average current to coil 21. At low PRF's a very large capacitor may be required to completely eliminate the pulse surges in the resistor. For economy and space saving, some pulse surges can be tolerated since there is additional filtering elsewhere in the regulator circuit.

Resistor 41 may be only a few ohms, and the voltage thereacross is supplied through resistor 46 to transistor Q2. Diode 47 protects the transistor against reverse voltage breakdown. The collector output of Q2 is supplied to the input of Q3 through resistors 48, 49. Q3 is supplied with collector voltage from the power supply +V through resistor 51 which serves as the primary load resistor. A large filter capacitor 52 substantially eliminates any voltage variations in line 42 due to any remaining surges in the input from resistor 41, and maintains the control voltage in line 42 substantially constant despite current flow during clipping. A small resistor 53 protects Q3 from excessive current when the apparatus is switched on.

In the absence of current through 41, or for small currents therethrough outside the range of regulation, the voltage in line 42 will be at or near the power supply voltage as indicated by $V_o$ in FIG. 3($b$). As the current increases through resistor 41 and comes within the regulating range, the voltage in line 42 will decrease, as shown by $V_1$. A further increase in current will result in a further voltage decrease, as shown by $V_2$. Thus the voltage in line 42 will vary with the average current through resistor 41, and hence through test coil 21, within the regulating range.

Pulses $a$ from the pulse generator are supplied to transistor Q4 serving as an inverting amplifier, and the output pulses are supplied through a coupling circuit 54 to Q5, Q6 connected as an intermediate complementary driver which drives the coil driver Q1. Clipping of the tops of the pulses is produced by a shunt circuit including diode D1 and capacitor 55. The capacitor guards against transients, etc. which may arise in line 42, and may be small since the large capacitor 52 provides most of the filtering.

Q4 inverts the input pulses and, outside the regulating range, produces output pulses such as shown in full lines in FIG. 3($c$) with amplitudes designated $V_o$. The pulses will be at full amplitudes, with their tops at nearly +V. This may be the same as the +V to the regulator and coil driver circuit. In the regulating range, say at $V_1$, current will flow through D1 and clip the tops of the pulses to a value $V_1$ (disregarding the contact potential) as shown in FIG. 3($c$). For a lower control voltage, say $V_2$, more of the pulse tops will be clipped off, as seen in FIG. 3($c$). Thus within the regulating range the amplitude of the clipped pulses will decrease when the control voltage decreases and increase when the control voltage increases. Accordingly the amplitude of the clipped pulses will decrease as the average current through resistor 41 and coil 21 increases, and vice versa.

It is possible to eliminate resistor 51 and the connection to +V, and obtain current for Q3 and capacitor 52 from the clipper circuit through diode D1. However, this arrangement has not been found as satisfactory as that shown.

The regulated pulses of FIG. 3(c) are applied to the base of Q1 and, by emitter follower action, to coil 21. Due to the inductance of coil 21, when a voltage pulse is applied thereto the current rises at a rate determined by the time constant L/R of the charging circuit, where L is the coil inductance and R is the total resistance of the series current path through the coil. In the specific embodiment here considered, the pulse width is narrower than the time constant so that the rise in current at 56 in FIG. 3(e) is approximately linear. When coil driver Q1 is cut off at the end of a pulse, current continues to flow in coil 21 until the energy stored in the coil at the end of the pulse is dissipated. The lower end of coil 21 may be connected to ground if desired. However, in this embodiment a Zener diode 23 shunted by capacitor 24 is employed to aid in dissipating the stored energy, and shaping the pulses.

When current flows through coil 21 during the applied pulses, capacitor 24 charges to the Zener breakdown voltage, say +12 volts. Capacitor 24 maintains this voltage at point 57 throughout the operation. At the end of a pulse, when the base of Q1 is brought to ground, the voltage across coil 21 reverses so that the top of the coil is negative to point 57. This negative voltage is normally greater in magnitude than the positive voltage at 57 so that the emitter of Q1 is negative to ground and Q1 remains on. Thus a current path exists through Q1, coil 21 and Zener 23 to ground, and current flows with resultant dissipation of the energy stored in coil 21. Initially the resistance of the Zener may be fairly low and approximately constant. However, as the current decreases and approaches the knee of the Zener characteristic, the Zener resistance increases rapidly and becomes quite non-linear with respect to current. Thus as the current decreases, the discharge time constant L/R, where R includes the Zener resistance, becomes smaller. The overall result is to decrease the discharge time and make the discharge current more linear with time.

FIG. 3(d) shows the voltage at the top of coil 21 and at the emitter of Q1. Prior to a pulse it is at $V_z$ as established by the Zener diode 23 and capacitor 24. When a pulse is applied, the voltage rises to a value depending upon the amount of regulation present. At the end of a pulse, the voltage drops to approximately ground potential at 58 since the Q1 emitter cannot go much below ground. At the end of the discharge, the voltage rises to $V_z$, and biases Q1 completely off.

With proper choice of parameters and a particular set of operating conditions, the current waveform may be an approximately isosceles triangle, as shown in full lines in FIG. 3(e). Under other conditions, the discharge current may flow for a longer or shorter time, since both the amplitude of the driving pulses and the resistance of the Zener diode affect the discharge time.

At a given PRF within the regulating range, maintaining the average test coil current constant will maintain the peak current amplitude approximately constant. There may be some change in peak current amplitude if the impedance of the test coil changes sufficiently to produce substantial changes in the current waveshape. However, the current amplitudes will be maintained more constant than without the regulating action, and in practice the regulation has been found effective to maintain satisfactory sensitivity under operating conditions normally encountered.

Changing the PRF of the applied pulses, while keeping the duty cycle constant, may also change the current waveform since the pulse width and the time interval between pulses will change. Thus for a higher PRF the charging time will be shorter and the discharge time may be relatively longer if the same test coil is used.

At high PRF's the apparatus may go out of regulation, since the higher impedance of the test coil may reduce the current pulses to levels yielding an average current below the current which the regulator is designed to maintain. This may be tolerated in practice since the reduced current flow at high PRF's produces less heating in the coil. Or, the regulating circuit may be changed so as to regulate over the desired frequency range.

It will be noted that for a particular set of conditions, the average current in the test coil can be changed by changing the series resistor 41. Increasing the resistance lowers the clipping level in line 42 for a given current flow, and vice versa. The power supply voltage for the regulator comprising Q2, Q3 could also be increased somewhat above that for the clipper comprising Q4 and D1, so that pulses can be clipped nearer the tops thereof. Also, if test coils of lower inductance are practicable, greater current flow for voltage pulses of given magnitude can be obtained, thereby enabling regulation to be maintained to higher PRF's.

In addition to regulating the average coil current, the circuit has the marked advantage of protecting the coil driver Q1 from burn out in case the coil 21 becomes short-circuited. In such cases the current through resistor 41 will tend to go very high, with resultant heavy clipping of the pulses supplied to Q1, thereby limiting the current in Q1 to approximately the selected average current. This is important in practice, since high power transistors suitable for pulse operation over a wide range of PRF's, say 2.5 KH to 600 KH, are quite expensive.

The invention has been described in connection with a preferred embodiment thereof. It will be understood that changes may be made in the circuit design within the spirit and scope of the invention, and different circuits employed to produce the desired result.

I claim:

1. In pulse eddy current testing apparatus including a pulse generator and test coil means for inducing eddy currents in an object under test, means for regulating the pulses applied to said test coil means which comprises
   a. a D-C power supply for supplying current to said test coil means,
   b. a coil driver having an output connected in series between said D-C power supply and said test coil means and an input supplied with pulses from said pulse generator for applying corresponding pulses to the test coil means,
   c. regulator means including a resistor connected in series between said D-C power supply and said coil driver for producing a control signal varying with the average current to said test coil means,
   d. and amplitude control means responsive to said control signal for changing the amplitude of said pulses supplied to the coil driver in a direction to maintain said average current to the test coil means substantially constant.

2. Apparatus according to claim 1 in which said coil driver is a transistor connected as an emitter follower.

3. Apparatus according to claim 1 including a Zener diode shunted by a capacitor connected in series with said test coil means at the end thereof opposite said coil driver.

4. Apparatus according to claim 1 in which said regulator means includes an input circuit responsive to the voltage across said resistor, an output circuit supplied with a D-C voltage, and filter means connected in at least one of the input and output circuits to produce a D-C output forming said control signal.

5. Apparatus according to claim 4 in which said amplitude control means includes a clipper connected in the path of pulses from said pulse generator to said coil driver, said clipper being supplied with said control signal to change the amplitude of the pulses supplied to the coil driver.

6. In pulse eddy current testing apparatus including a pulse generator and a test coil for inducing eddy currents in an object under test, means for regulating the pulses applied to said test coil which comprises
 a. a D-C power supply for supplying current to said test coil,
 b. a coil driver for applying pulses to said test coil and having the output thereof connected in series between said D-C power supply and the test coil,
 c. a resistor connected in series between said D-C power supply and said coil driver,
 d. a regulator circuit having an input circuit responsive to the voltage across said resistor, an output circuit supplied with a D-C voltage, and filter means connected in at least one of the input and output circuits for producing a D-C control signal varying with the average current to said test coil,
 e. a clipper supplied with pulses from said pulse generator and with said D-C control signal to reduce the amplitude of the output pulses therefrom as said average current to the test coil increases and vice versa,
 f. and means for applying the output pulses from said clipper to said coil driver to produce pulses in said test coil whose average current is substantially constant.

7. Apparatus according to claim 6 in which said coil driver is a transistor connected as an emitter follower.

8. Apparatus according to claim 7 including a Zener diode shunted by a capacitor connected in series with said test coil at the end thereof opposite said transistor coil driver.

* * * * *